United States Patent [19]

Sefidvash et al.

[11] Patent Number: 5,471,586

[45] Date of Patent: Nov. 28, 1995

[54] INTERFACE SYSTEM HAVING PLURALITY OF CHANNELS AND ASSOCIATED INDEPENDENT CONTROLLERS FOR TRANSFERRING DATA BETWEEN SHARED BUFFER AND PERIPHERAL DEVICES INDEPENDENTLY

[75] Inventors: Khorvash Sefidvash, Laguna Niguel; Seyed H. Hashemi, Mission Viejo, both of Calif.

[73] Assignee: Unisys Corporation, Blue Bell, Pa.

[21] Appl. No.: 949,286

[22] Filed: Sep. 22, 1992

[51] Int. Cl.[6] .......................... G06F 13/00; G06F 13/12; G06F 13/36
[52] U.S. Cl. .................. 395/284; 395/250; 395/308; 395/826; 395/828; 364/238.3; 364/239.5; 364/239.7; 364/240.2; 364/242.92
[58] Field of Search ..................... 395/275, 425, 395/250

[56] References Cited

U.S. PATENT DOCUMENTS

| | | | |
|---|---|---|---|
| 4,484,275 | 11/1984 | Katzman et al. | 364/200 |
| 4,672,535 | 6/1987 | Katzman et al. | 364/200 |
| 4,672,537 | 6/1987 | Katzman et al. | 364/200 |
| 5,206,943 | 4/1993 | Callison et al. | 395/425 |

FOREIGN PATENT DOCUMENTS

| | | |
|---|---|---|
| 0427119 | 5/1991 | European Pat. Off. . |
| 04674 | 3/1992 | WIPO . |

Primary Examiner—Thomas C. Lee
Assistant Examiner—Marc Weinstein
Attorney, Agent, or Firm—Alfred W. Kozak; Mark T. Starr; Stanton D. Weinstein

[57] ABSTRACT

A device interface module provides multiple concurrently operating data transfer channels between multiple groups of peripheral devices and ad multiported buffer memory which communicates via an interface bus to other external modules of a computer system.

5 Claims, 5 Drawing Sheets

INTERFACE SYSTEM HAVING PLURALITY OF CHANNELS AND ASSOCIATED INDEPENDENT CONTROLLERS FOR TRANSFERRING DATA BETWEEN SHARED BUFFER AND PERIPHERAL DEVICES INDEPENDENTLY

FIELD OF THE INVENTION

This disclosure relates to an interface module which provides data communication between a complex of disk drive units and a buffer memory system which communicates with a host computer.

CROSS REFERENCE TO RELATED APPLICATIONS

This disclosure is related to a co-pending application entitled "Multi-Ported Buffer Memory System for Disk Drive Complex" filed Sep. 21, 1992 as U.S. Ser. No. 948,381, still pending and which is included herein by reference.

BACKGROUND OF THE INVENTION

Present day computer systems are continually seeking storage methods for handling massive amounts of data with the capability of rapid and efficient retrieval of such data while still keeping down the costs and space requirements. Additionally, these systems require continuous operation with error correction capabilities for maintaining integrity of the data stored and retrieved.

Problems occur in how best to transfer data between host computers and multiple banks of disk storage units. It is desirable to relieve the host computers, as much as possible, with the burdens of managing the storage and retrieval operations to/from banks of disks. The presently described Device Interface Module (DIM) provides data transfer functions to/from disk units which relieve burdens on host computers and enhance data transfer throughout by providing multiple numbers of independent SCSI Busses which permit different concurrent data transfer cycles to be conveyed between different host computers and different disk storage units.

GENERAL OVERVIEW

A disk drive complex operating system consists of a family of stand-alone data storage systems. These are connected to and attached to a host computer by means of a standard small computer systems interface (SCSI) or alternatively via a fiber channel or Block MUX channel interface. As seen in FIG. 1B, the overall system functions with a host processor 4 which connects to a channel interface module (CIM) $8_c$ which again operates through a device interface module (DIM) $8_d$ which then interchanges with a series of disk drive units 70.

A number of usable configurations will permit any combination of dual ported Channel Interface Modules (CIM) and quad ported Device Interface Modules (DIM).

Figure 2:
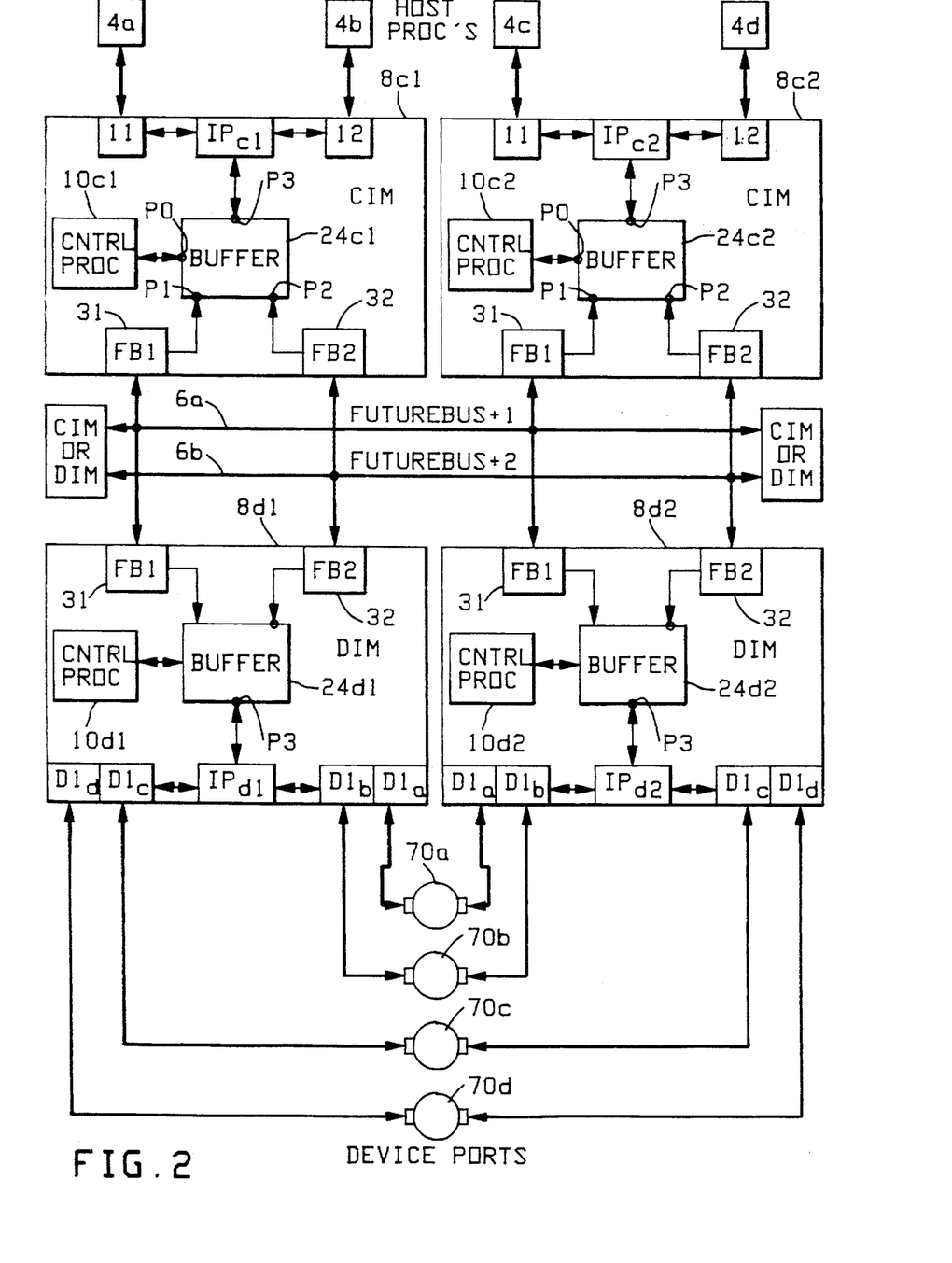
FIG. 2 is a diagram showing the elements of the Channel Interface Module and the Device Interface Module in relation to the disk units and host computers.

Thus one possible configuration would consist of four CIMs and four DIMs which would provide 8 host ports and 16 SCSI buses. FIG. 2 indicates "one-half of this type of configuration.

An unformatted data storage capacity for the disk only storage version is expandable from a basic 2.3 gigabytes (single disk drive) up to 110 gigabytes (48 dual ported disk drives configured with 7 drives per dual SCSI bus.

The disk only option also supports the RAID technology known as "Redundant Array of Inexpensive Disks". The above described complex system has the capability for fully redundant operation and additionally for "live replacement" modules for all subsystems to permit virtually uninterruptable access to stored information. Further, data loss in such a redundant configuration is virtually eliminated.

The hereinafter described logic modules in FIG. 2 (CIMs and DIMs) in the system communicate with each other using the industry standard IEEE "Futurebus Plus" Interface.

The CIM modules $8_c$ ($8_{c1}$, $8_{c2}$) provide communication to the host system 4 via a fiber channel interface which can use the industry standard FIPS 97 protocol or again via the industry standard SCSI interface.

The device interface modules (DIM) $8d$ ($8_{d1}$, $8_{d2}$) provide control and communication with the data storage devices (a series of disk drive modules) by means of the industry standard SCSI-2 Interface.

All the active components or modules involved in the system are designed for "live replacement", that is to say, any unit may be replaced without shutting down the system.

Additionally, there is full notification to the host computer system 4 (FIG. 1B) in order to permit on-line maintenance capability.

The regulated DC power for the CIM/DIM modules (FIG. 2) of the system is provided by two AC to DC power converter modules. These power modules operate as a parallel redundant pair and normally share the power load of the system.

In the event of failure of either power module, the other power module automatically assumes the full load of the system until replacement of the faulty module can be effected. Failure information is sent to the host 4 to alert the system that module replacement is required. The live replacement capability of the power modules assures uninterrupted operation of the system in the event of power module failure.

The system provides for a Futurebus backplane assembly which consists of two 32-bit wide, fully independent backplane data buses, each having their own associated Futurebus control bus lines. In the event of a fault on one of the buses, the system will automatically reconfigure to utilize single bus operation but continue to operate in a reduced band width mode.

With the option of using a fiber channel or Block MUX Channel interface module, there is provided communication with the host system 4 (or multiple host $4_a$, $4_b$, $4_c$, $4_d$) using a fiber channel interface. Here there are two simultaneously usable channel connections provided standardly. Any communication with additional CIM $8_c$ and DIM $8_d$ modules within the system is done using the industry standard Futurebus Interface, as seen in FIG. 2 via busses $6_a$ and $6_b$.

The CIM module $8_c$ (FIG. 2), in addition to providing host communication functions, also provides control and management of the Futurebus Interface plus management of all commands issued through its fiber or Block MUX channel interface. The connection between a host 4 and a data storage device (such as 70) during execution of a command is defined as a logical path. A logical path within the system segment consists of a CIM module ($8_c$) and a DIM module ($8_d$) interconnected by the Futurebus backplane assembly so that the connection from the DIM to the storage devices (disk drive units 70) via the SCSI-2 interface bus is accomplished.

The SCSI Channel Interface Module (CIM) $8_c$ (FIG. 2) provides communication with the host system 4 via the industry standard SCSI-2 interface. Four channel connections are generally provided as standard. Most basic functions of the SCSI-CIM are identical to the functions provided by the fiber channel-CIM.

The Device Interface Module DIM $8_d$ (FIG. 2) provides communication (in a RAID Simplex Mode) with data storage devices 70 within the described system by means of the industry standard SCSI-2 interface. Four SCSI Interface connections are provided as standard. Communication with other CIMs and DIMs modules within the system is done using the industry standard Futurebus Interface.

The Device Interface Module (DIM) also provides control/management of the Futurebus Interface and also functions as a host adaptor and SCSI Initiator for all received commands. Each individual disk DIM can function as a magnetic disk controller or as an optical disk controller. These type of functional characteristics are determined by the DIM microcode which is down loadable from the host system 4 via the CIM/Futurebus connection.

SUMMARY OF THE INVENTION

The presently described Device Interface Module (DIM) supplies four SCSI busses for concurrent and parallel data transfer operations so that any host computer in a multiple host system can concurrently command each one of multiple numbers of disk drive units for storage/retrieval operations.

Dual bus means provide connection to a multiported buffer memory which communicates with one or more host computers via an adjacent module (CIM) buffer.

The Device Interface Module (DIM) has four SCSI busses, each of which can operate independently using its own SCSI Protocol Controller (SPC). The SCSI Protocol Controllers (SPC) are operated by individual script routines located in individual script memories. The individual script memories are controlled by a single DIM Control Processor. The DIM Control Processor functions to arrange subsequent data transfers without interruption to ongoing data transfers.

By using the multiple SCSI channels and multiported buffer, multiple and concurrent data transfer operations can be effectuated between various host computers and various disk storage modules without degradation of the band pass capabilities.

BRIEF DESCRIPTION OF THE DRAWINGS

FIG. 1 is a drawing showing the main elements and architecture of the Device Interface Module; FIG. 1 is shown on two sheets designated as FIG. 1A and 1B;

DESCRIPTION OF PREFERRED EMBODIMENT

Figures 1, 1A:
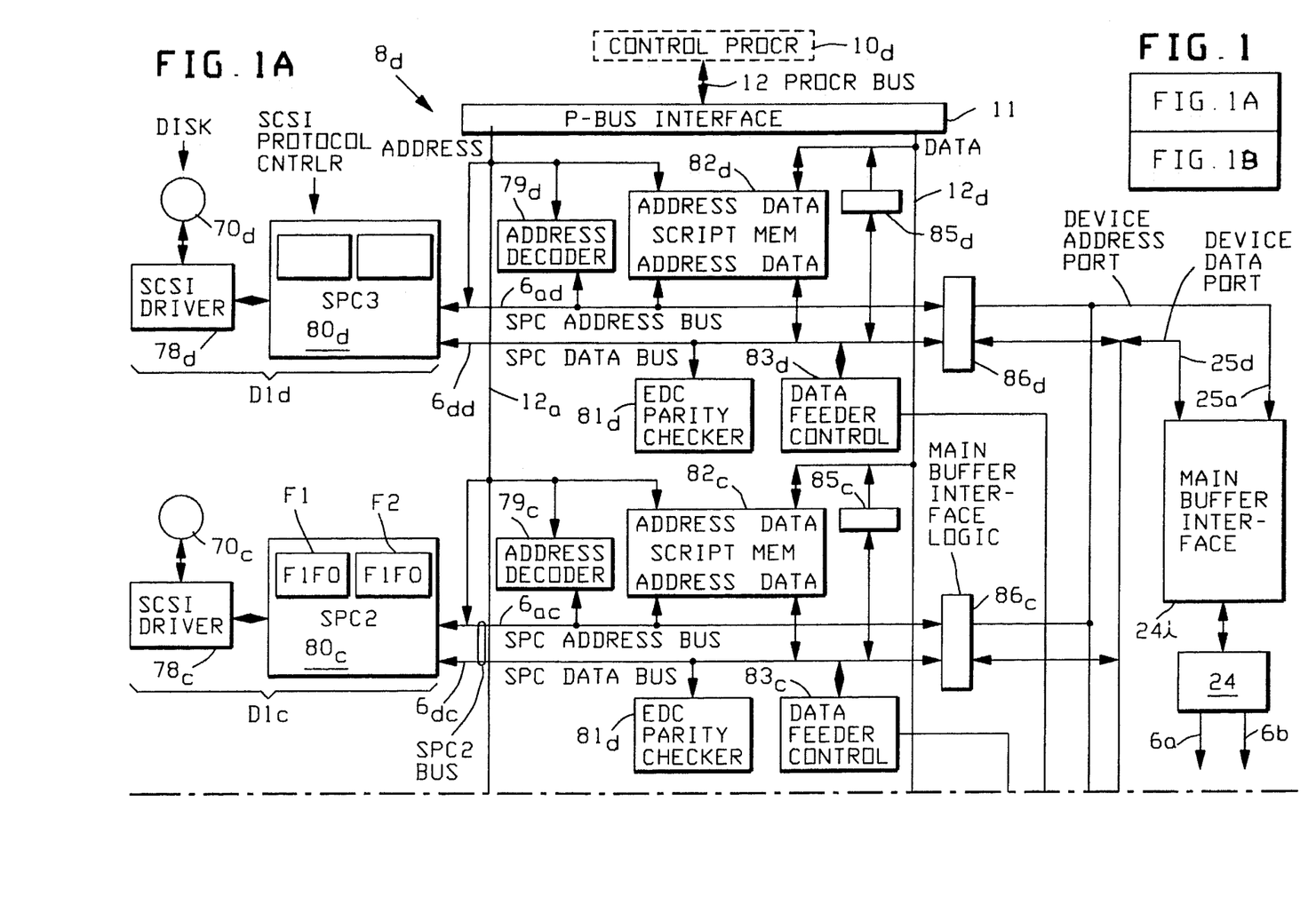
Figure 1B:
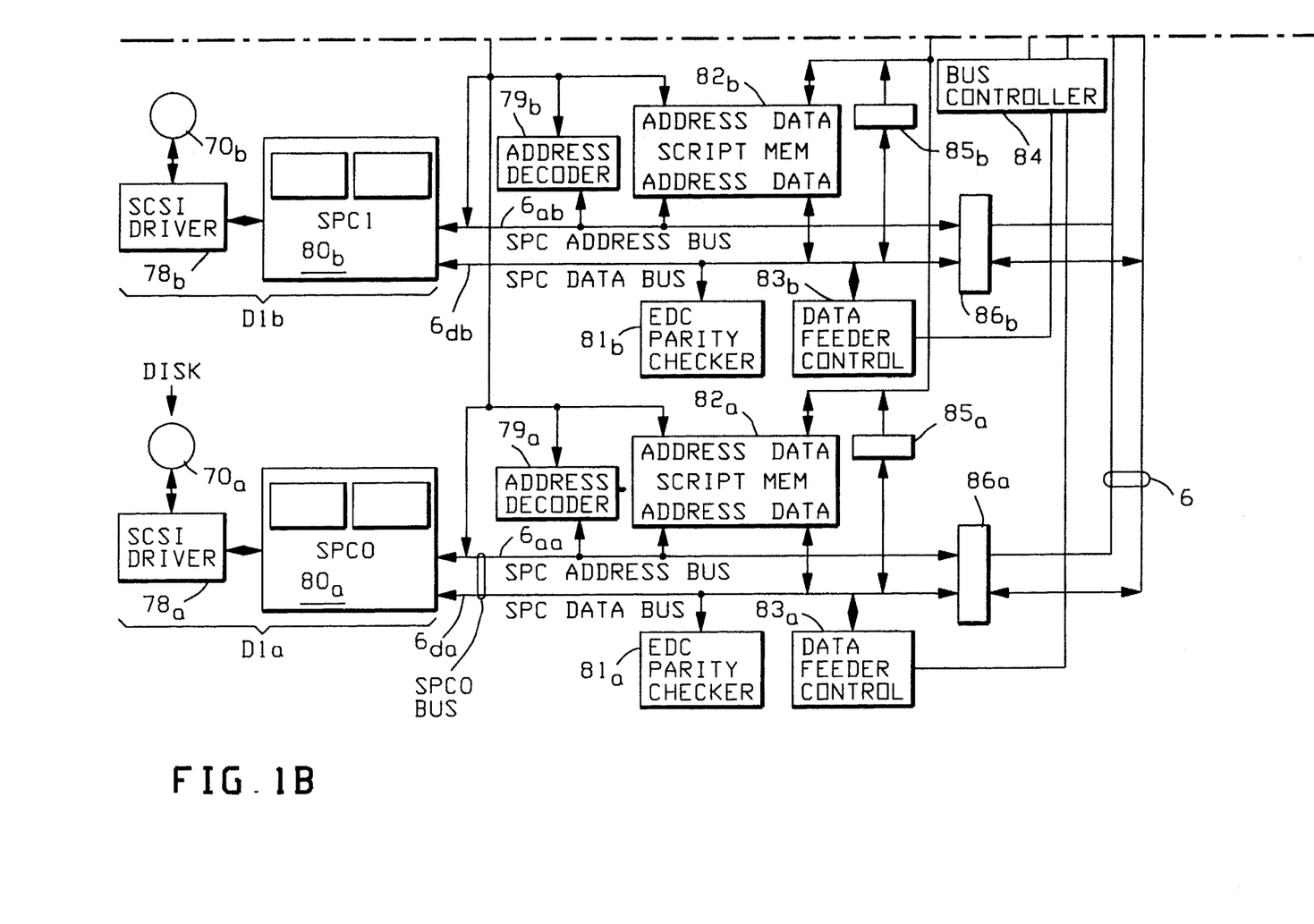
Figure 1C:
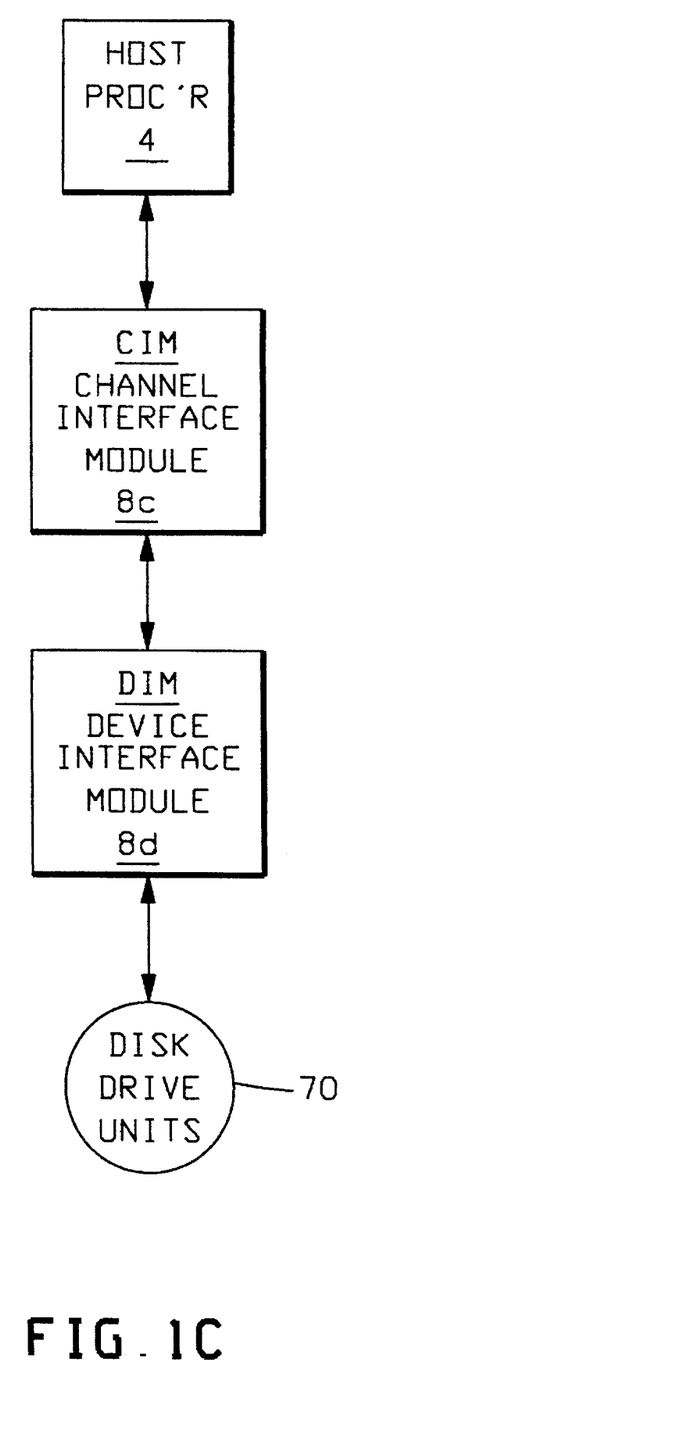
FIG. 1C is an overall block diagram of disk storage system which uses the Device Interface Module.

Referring to FIG. 1A, there is seen an overall block diagram of the device interface module $8_d$ of the present system which is used as a simplex device interface wherein four channels are provided for SCSI protocol controllers (SPC), which connect to a series of disk drives $70_a$, $70_b$, $70_c$ and $70_d$.

The Device Interface Module $8d$ (DIM) connects attached peripheral units 70 to future busses $6_a$, $6_b$ (FIG. 2) via multiported buffer memory 24 and individual Device Channels Interfaces $D_{1a}$, $D_{1b}$, $D_{1c}$ and $D_{1d}$. The Device Interface Module $8d$ of FIG. 2 basically consists of:

(a) Control Processor 10 (10d) (Microprocessor);

(b) Main Buffer Memory 24 and interface $24_i$;

(c) Device Channel Interfaces ($D_{1a}$, $D_{1b}$, $D_{1c}$, $D_{1d}$) consisting of SCSI Protocol Controller (80) and SCSI Driver (78);

(d) Future busses ($6_a$, $6_b$ of FIG. 2) also called Internal Busses, also shown in FIG. 1A as $6_{aa}$, $6_{ab}$, $6_{ac}$, $6_{ad}$–$6_{da}$, $6_{db}$, $6_{dc}$, $6_{dd}$.

As seen in FIG. 2, which indicates the network combination of channel interface modules (CIM) and device interface modules (DIM), the two lower module Device Interface Modules act as controllers for data transfer blocks $8_{d1}$ and $8_{d2}$ represent the device interface modules (DIM) which provide the interface from the Futurebus Systems (+1, +2) to the device ports $D_1$ ($D_{1a}$, $D_{1b}$, $D_{1c}$, $D_{1d}$) of a series of disk drives designated $70_a$ thru $70_d$. As noted in FIG. 2, each of the DIM (device interface module) controller boards $8_d$ are provided with a buffer $24_d$, and a control processor, $10_d$, which is used to operate through the device ports $D_1$ by means of the interface processor $IP_d$ ($IP_{d1}$, $IP_{d2}$). Additionally, the data communication channels provide for the Futurebus Interfaces 31 ($FB_1$) and 32 ($FB_2$) to connect to the two Futurebusses $6_a$ and $6_b$ for communication to the channel interface module $8_c$. Each DIM $8_d$ and $8_{2d}$ communicates to its associated CIM $8_{c1}$ and $8_{c2}$.

Now referring to FIG. 1A, there is seen a more detailed block diagram of the device interface module $8_d$ (DIM) for the simplex configuration.

As seen in FIG. 1A, the DIM control processor $10_d$ communicates via a processor busses 12 ($12a$, $12d$) to the processor bus interface 11. At this point, there is provided an address bus $12_a$ which connects respectively to a series of address decoders $79_a$–$79_d$ and also to a series of SCSI protocol controller address buses designated $6_{aa}$, $6_{ab}$, $6_{ac}$, and $6_{ad}$.

Likewise, from the processor bus interface 11, there is a data bus $12_d$ which is connected to a set of four script memory units $82_a$–$82_d$ which function to execute data transfer programs for the SCSI busses $6_a$ and $6_d$.

As seen in FIG. 1A there are a series of four SCSI Protocol Controllers designated SPC0, SPC1, SPC2, and SPC3 which are itemized as $80_a$–$80_d$. Each of the SCSI Protocol Controllers has a SPC bus designated as an SPC Address Bus $6_a$ and SPC Data Bus $6_d$. The SPC address buses are designated as $6_{aa}$, $6_{ab}$, $6_{ac}$, $6_{ad}$. The SPC Data Buses are designated as $6_{da}$, $6_{db}$, $6_{dc}$, $6_{dd}$. Each of the protocol units $80_a$ thru $80_d$ a connect to a set of SCSI driver units $78_a$–$78_d$ which respectively then connect to a set of disk drive units $70_a$–$70_d$. It may be noted from FIG. 2 that each disk drive has two ports enabling data for concurrent communication to/from the DIM $8_{d1}$ and DIM $8_{d2}$. The SPC address buses each respectively connect to their local address decoders 79 and script memories 82 in addition to connecting to a buffer memory interface logic unit 86 ($86_a$–$86_d$). This logic unit allows data to move to/from the Main Buffer Interface which is a multiported memory system described in the aforementioned patent application on "Multiported Buffer Memory System" For Disk Drive Complex which is included herein by reference.

Each of the SPC data buses ($6a$, $6d$, FIG. 2) connect to a

EDC (Error Detection Code) parity checker ($81_a$–$81_d$) and also to a data feeder control unit ($83_a$–$83_d$) respectively. The data feeder units $83_a$–$8_d$ are managed by the bus controller 84. Each of the data feeder controls 83 will be seen to lie connected to the bus controller 84. The bus controller 84 handles bus protocol and arbitrates between different protocol controllers (SPC) as to which one will get ownership of bus 6.

Bus transfer units $85_a$ through $85_d$ provide getaways between the various SCSI busses, $6_{da}$, $6_{db}$, $6_{dc}$, $6_{dd}$, to allow data transfer to the buffer data bus $25_d$.

It will be noted that each of the SCSI protocol controllers, $80_a$ thru $80_d$, provide an SPC bus 6 which has a first bus $6a$ for addresses and a second bus $6d$ for data. These buses are fed to the device ports $D_1$ wherein the device data port is designated $25_d$ (FIG. 1A) and the device address port is designated $25_a$. These feed to the main buffer interface 24. The ports $25_a$, $25_d$ correlate to port $P_3$ on FIG. 2.

The subject device interface module (DIM) in its simplex device interface configuration will be seen to contain the necessary logic to control and transfer data across four SCSI-2 Interfaces. When two DIMs ($8_{d1}$, $8_{d2}$) are used, this permits the accomplishment of data transfer to/from each disk unit concurrently through two ports on each disk unit. Each physical interface to the disk devices 70 is 8-bits wide and operates at 10 megahertz.

Each SCSI bus set ($6_a$, $6_d$) execute independently using its SCSI protocol controller 80 which is controlled by "Script" routines loaded by means of the DIM control processor $10_d$.

PROTOCOL CONTROLLER (SPC): The Protocol Controllers $80_a$–$80_d$, (FIG. 1A) provide protocol and data handling. The SPC unit 80 supports an 8-bit SCSI bus with 10 megabytes per second transfer rate. The SCSI bus protocol is controlled through a series of "Script" commands generated by the DIM Control Processor $10_d$. These Script commands are fetched from the Script memory (SM) unit such as memories $82_a$–$82_d$. After fetching, they are executed by the protocol controller units $80_a$–$80_d$ respectively.

Thus there are four SCSI connections for each Device Interface Module DIM $8_d$, and there are four protocol controller units, 80, which exist in each Device Interface Module $8_d$. For each protocol controller unit 80 there is a protocol controller bus, SPC bus 6, ($6_a$, $6_d$) which connects the protocol controller 80 to the Script Memory 82, to the processor address bus $12_a$, and to the main buffer memory device data and address read ports 25 ($25_a$, $25_d$). The protocol controller SPC unit 80 queues the incoming data bytes from the SCSI bus 6 and assembles a 32-bit data word within its internal FIFO (F1, F2) (first in first out register). After four words of data are queued in the FIFO, the direct memory address (DMA) will burst data onto the SPC data bus $6_d$ over to the main buffer memory 24 via ports $25_a$, $25_d$.

While the protocol controller SPC 80 is transferring bursts of data into the main buffer memory 24, it also queues incoming data from the SCSI bus 6 into a second bank of FIFOs $F_1$, $F_2$ in the protocol controller SPC 80. The four data words can then be transferred completely from the protocol controller SPC unit 80 into the main buffer 24 before the second bank of FIFO registers in the protocol controller SPC unit is filled.

The protocol controller SPC unit 80 is initialized by the device interface module DIM processor $10_d$ (FIG. 1A) by selecting the desired SPC unit 80 and putting it into a "slave mode". The DIM control processor $10_d$ accesses the internal register of the SPC unit 80 through the P-bus interface logic 11 and the SPC bus 6. Each protocol controller SPC unit 80 can be accessed by the DIM processor $10_d$ while the other SPC units are running script commands or are transferring data.

Script Memory (SM)82: The Script Memory 82 has a first set of ports for addresses dual and a second set of dual ports for data which can be accessed by the SPC unit 80 or by the DIM control processor $10_d$ concurrently. Each SPC unit 80 has a dedicated Script Memory Module 82, which allows the SPC unit 80 to execute Script commands independently and concurrently. The DIM control processor $10_d$ can lock out the SPC unit 80 from modifying the Script Memory 82 by holding on to ownership of the SPC bus 6. The Script memories 82 are organized as 32-bit words to enable them to be accessed by the protocol controller SPC units 80 or by the DIM control processor $10_d$.

EDC PARITY CHECKER: The EDC (Error Detection Correction) parity checker 81 ($81_a$–$8_d$) functions so that each data record is checked for correctness by performing an EDC check during data transfer between the SPC 80 and the main buffer memory 24 on the SPC bus 6. In case of a EDC error, an interrupt is generated to the DIM control processor $10_d$ for error handling.

The EDC logic in the checker 81 tracks the number of words transferred on the SPC bus 6 in order to detect the end of a record for the EDC check. A record is 2048 words long and is fixed for all configurations of the present system designated as the "Spectrum" System.

Each word consists of 4 bytes and each byte is accompanied with a parity bit. These parity bits are passed to the SPC unit 80 from the main buffer memory unit 24 along with data, or from the SPC unit 80 to the main buffer 24 by means by the SPC data bus $6_d$. Odd parity is checked by the EDC parity checker unit 81.

Parity checking provides an extra data integrity check over and above the EDC checking. A typical system will use the EDC for data integrity, but for the class A type of NSD system which does not allow a EDC header to be stored on devices, the use of data parities then provides data integrity throughout the system.

The EDC and the parity error reporting interrupt is a maskable interrupt to the DIM control processor $10_d$. The error reporting interrupt can be disabled during the initialization of the DIM $8_d$ by masking out the interrupt signals at the DIM control processor $10_d$.

BUS CONTROLLER (BC) 84: The bus controller function handles the SPC bus 6 (FIG. 1A) operations by generating the required handshake signals to interface the SPC bus 6 with the device port 25 of the main buffer 24 and also the processor bus 12 ($12a$, $12d$) of the DIM control processor $10_d$. The bus controller arbitrates the bus ownership of the SPC bus 6 between the DIM control processor $10_d$ and anyone of the SPC units 80 ($80_a$–$80_d$). It also arbitrates and funnels the four SPC buses ($6_a$–$6_d$) to the device port 25 of the main buffer memory 24 by "slicing" the access time. The protocol controller SPC 80 unit is the default owner of the SPC bus 6, but the DIM control processor $10_d$ can get bus ownership at any time and hold the bus for an extended period. There are no protocol controller SPC 80 operations which can occur during this period.

MAIN BUFFER INTERFACE LOGIC (MBIL) ($86_a$–$86_d$) FIG. 1A: The main buffer interface logic connects the four SPC buses 6 to the device port 25 of the main buffer memory 24. It uses time slices to allow each SCSI protocol controller, SPC 80 to have equal access to the main buffer port 25. Each SPC 80 takes 1600 nanoseconds to assemble and queue 4 words of data. The main buffer device port 25 is divided into 4 time slices of 400 nanoseconds each. During these 400 nanoseconds, each protocol controller SPC 80 transfers its data through the device port 25 over to the main buffer 24. This scheme requires the address and first burst data transfer to occur and which are immediately available to the main buffer interface unit 86 ($6_a$, $86_b$, $86_c$, $86_d$). The transfer is held onto the SPC bus 6 until the time slice allocated for the particular SPC bus is granted. At the allocated time, the transfer is initiated and continues until the 4 words are moved to the main buffer 24 or away from the main buffer 24.

DATA FEEDER CONTROLLER (DFC) 83: The data feeder controller unit ($83_a$–$83_d$) manages to work at feeding the data and keeping track of the number of data bytes transferred to the protocol controller SPC 80 from the main buffer 24. The data feeder controller 83 is initialized by the protocol controller 80 with the amount of data available in the main buffer 24. The DFC 83 tracks the number of data words transferred between the protocol controller SPC 80 and the main buffer 24. A flag is raised to the DIM control processor $10_d$ if the data pointer becomes 0. The DIM control processor $10_d$ updates the pointer in the data feeder controller as more data becomes available in the DIM buffer memory 24. With the transfer speed difference between the Futurebus input ($6_a$, $6_b$, FIG. 2) to the buffer 24 and the SCSI interface, the DIM $8_d$ will be more than capable of keeping the protocol controllers SPC 80 adequately supplied with data words.

The DIM control processor $10_d$ holds on to the SPC bus 6 and reads the ID register from the Script Memory (SM) portion in order to determine which peripheral device the SPC 80 is actually processing. If the ID matches with the device which the DIM control processor $10_d$ wants to update, then it reads the value from the DFC (Data Feeder Controller 83) pointer and calculates the new value of the pointer based on the amount of data that has arrived into the main buffer 24. The DFC pointer is updated and the SPC bus 6 is released to the protocol controller SPC 80.

In the case of a SPC active device ID which does not match with the device ID which the DIM control processor $10_d$ wants to update, then the DIM control processor $10_d$ reads from the "save table" of the device in the SM. (Script Memory 82). Then it calculates the new value and updates the table so it can be used then by the protocol controller SPC 80 when that device becomes active again.

P-Bus Interface Logic, 11: The processor bus interface logic is used to generate the handshake signals between the protocol controller SPC 80 units and the DIM control processor $10_d$.

SCSI Bus Driver 78: The SCSI bus drivers will be seen to interface each of the protocol controller units SPC 80 with peripheral devices attached onto the SCSI bus 6. These are differential drivers which comply with standard small computer systems interface specifications.

Figure 3:
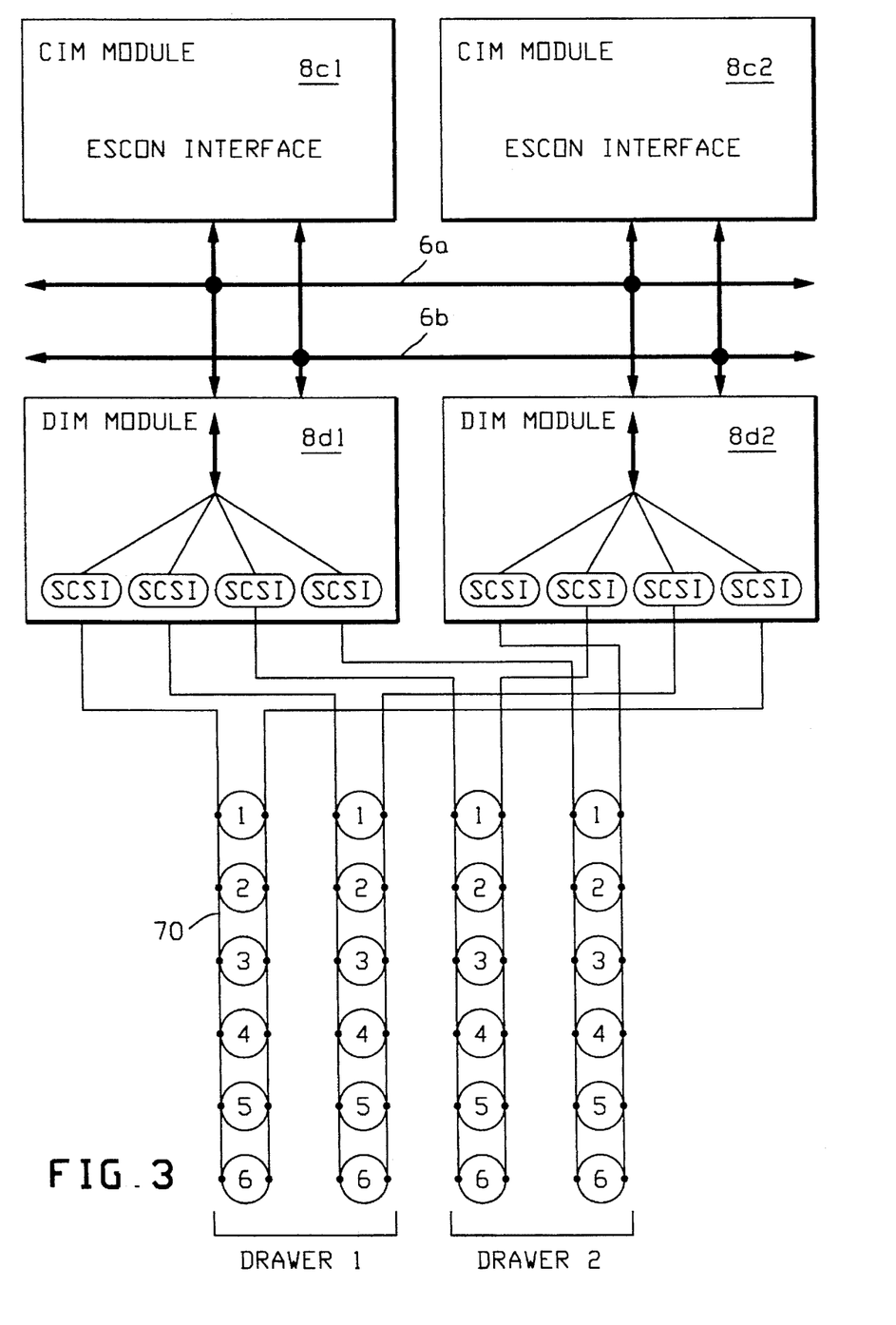
FIG. 3 is a schematic drawing illustrating the four SCSI channels in the Device Interface Module.

FIG. 3 shows a schematic block diagram of the simplex configuration of the disk drive system. As seen in FIG. 3 a series of disk drive units are congregated in drawers so that drawer 1, for example, holds 12 disk drive units while also drawer 2 also holds 12 disk drive units. Then each bank of disk drive units is connected to a small computer systems interface channel in the DIM module $8_{d1}$ and DIM module $8_{d2}$. Likewise each of the other banks of disk drive modules is similarly connected so that each bank of 6 disk drive modules will be seen to have connections to separate SCSI channels in each of the first and the second DIM modules, $8_{d1}$ and $8_{d2}$.

Each of the first and second DIM modules $8_{d1}$ and $8_{d2}$ will then connect through a Futurebus 6 to a set of channel interface modules (CIM) which are seen as CIM module $8_{c1}$ and $8_{c2}$. The CIM's communicate to the host computers of FIG. 2.

Described herein has been a Device Interface Module usable in a disk drive storage and retrieval system whereby multiple banks of disk drive units can each have independent SCSI line channels to the Device Interface module which provides control for multiple and concurrent data transfer operations between the disk units and a Futurebus interface which permits communication to one or more host computers.

While other variations of the described Device Interface Module may be implemented, it should be understood that the subject interface is encompassed by the following claims.

What is claimed is:

1. A device interface Module (DIM) for high speed data transfers between four groups of peripheral devices and first and second system busses, comprising:

(a) four independent protocol-controller means connecting four groups of peripheral devices for data transfer operations, each said protocol-controller means including:

(a1) FIFO register means for holding data destined to a buffer memory means and data destined for a connected peripheral device;

(b) four channel bus means connecting, respectively, each of said protocol controller means to said buffer memory means wherein each said channel bus means includes:

(b1) a dedicated script memory for holding commands from a control processor means to manage data transfer operations;

wherein each of said protocol controller means executes the commands independently for controlling the data transfer operations between the peripheral devices connected thereto and the buffer memory means via said FIFO register means associated with each said protocol controller means;

(c) bus controller logic means, coupling to each of said channel bus means, for granting equal time access period to each of said channel bus means;

(d) said control processor means, coupling to each of said channel bus means, for generating said script commands for each of said protocol controller means to control said data transfer operations; and (e) said buffer memory means for temporarily storing data received from said first or second system busses destined for said peripheral devices.

2. The device interface module of claim 1 wherein said buffer memory means includes:

(a) means for temporarily storing data received from said peripheral devices and destined for transfer to said first or second system busses.

3. The device interface module of claim 1 wherein each said script memory includes:

(a) first and second address ports for communication respectively with said control processor means and said channel bus means;

(b) first and second data ports means for communication respectively with said control processor means and said channel bus means.

4. A multiple device interface module system where a plurality of device interface modules communicate with first and second system busses, said system comprising:
(a) a plurality of device interface modules wherein each device interface module includes:
  (a1) first and second I/O port means connected to said first and second system busses for receiving and/or sending data to/from an internal buffer memory means;
  (a2) said buffer memory means for storing data received from said first and second system busses and for storing data received from a plurality of groups of peripheral devices;
  (a3) four independent protocol-processor port means connecting four channel bus means to four groups of peripheral devices for data transfer operations;
  (a4) each of said four channel bus means for transferring data to/from said protocol-processor port means from/to said buffer memory means and including:
    (a4a) script memory means for holding commands and programs received from a control processor means to manage data transfer operations;
    wherein each of said protocol-processor port means executes the commands independently for controlling the data transfer operations between the peripheral devices connected thereto and the buffer memory means;
  (a5) bus control logic means, coupling to each of said channel bus means, for granting equal time access period to each of said channel bus means; and
  (a6) control processor means, coupling to each of said channel bus means, for generating said script commands and programs for each of said protocol controller means to control said data transfer operations.

5. The device interface module system of claim 4 wherein said plurality of device interface modules include:
(a) means to connect a first protocol-controller port means of a first device interface module to one port of a selected peripheral device having two input/output ports;
(b) means to connect a second protocol-controller port means of a second device interface module to a second port of said peripheral device having two input/output ports.

* * * * *